US009471383B2

(12) United States Patent
Paul et al.

(10) Patent No.: US 9,471,383 B2
(45) Date of Patent: Oct. 18, 2016

(54) TASK ALLOCATION IN A COMPUTING ENVIRONMENT

(71) Applicant: Tata Consultancy Services Limited, Mumbai (IN)

(72) Inventors: Himadri Sekhar Paul, Kolkata (IN); Arijit Mukherjee, Kolkata (IN); Ansuman Banerjee, Kolkata (IN); Swarnava Dey, Kolkata (IN); Arpan Pal, Kolkata (IN); Pubali Datta, Kolkata (IN)

(73) Assignee: Tata Consultancy Services Limited, Mumbai (IN)

(*) Notice: Subject to any disclaimer, the term of this patent is extended or adjusted under 35 U.S.C. 154(b) by 0 days.

(21) Appl. No.: 14/667,459

(22) Filed: Mar. 24, 2015

(65) Prior Publication Data
US 2016/0011908 A1    Jan. 14, 2016

(30) Foreign Application Priority Data

Jul. 11, 2014    (IN) .......................... 2281/MUM/2014

(51) Int. Cl.
*G06F 9/50*    (2006.01)
(52) U.S. Cl.
CPC ............. *G06F 9/5027* (2013.01); *G06F 9/505* (2013.01); *G06F 9/5044* (2013.01)
(58) Field of Classification Search
CPC .................................................. G06F 9/5044
See application file for complete search history.

(56) References Cited

U.S. PATENT DOCUMENTS

| 8,214,836 B1* | 7/2012 | Markov ................ G06F 9/4881 718/102 |
| 8,392,572 B2 | 3/2013 | Chang | |
| 8,555,281 B1* | 10/2013 | van Dijk ............... G06F 9/4881 718/100 |
| 8,589,924 B1 | 11/2013 | Johnsen et al. | |
| 2006/0152756 A1* | 7/2006 | Fellenstein ........... G06Q 40/04 358/1.15 |
| 2008/0046888 A1 | 2/2008 | Appaji | |
| 2008/0209434 A1* | 8/2008 | Queck ................... G06F 9/5033 718/105 |
| 2008/0306866 A1 | 12/2008 | Fellenstein et al. | |
| 2010/0050172 A1 | 2/2010 | Ferris | |
| 2011/0154350 A1 | 6/2011 | Doyle et al. | |

(Continued)

FOREIGN PATENT DOCUMENTS

| CN | 102739838 | 10/2012 |
| EP | 2602715 | 6/2013 |

(Continued)

*Primary Examiner* — Emerson Puente
*Assistant Examiner* — Charlie Sun
(74) *Attorney, Agent, or Firm* — Schwegman Lundberg & Woessner, P.A.

(57) ABSTRACT

A method comprises, receiving, at each of a plurality of computing devices, a task execution estimation request message from a central server, the task execution estimation request message comprising a worst-case execution time (WCET) corresponding to the computing device. The method further comprises, computing, by each of the plurality of computing devices, an estimate task execution time for the task based on the WCET and a state transition model corresponding to the computing device, wherein the state transition model indicates available processing resources corresponding to the computing device. Further, the method comprises transmitting, by each of the plurality of computing devices, the estimate task execution time to the central server for allocation of the task to a computing device from amongst the plurality of computing devices based on the estimate task execution time corresponding to the computing device.

6 Claims, 2 Drawing Sheets

(56) References Cited

U.S. PATENT DOCUMENTS

| | | |
|---|---|---|
| 2011/0289200 A1 | 11/2011 | Patil et al. |
| 2012/0054175 A1* | 3/2012 | Barsness ........... G06F 17/30477 707/719 |
| 2012/0284383 A1 | 11/2012 | Dudek et al. |
| 2012/0284408 A1 | 11/2012 | Dutta et al. |
| 2013/0191843 A1 | 7/2013 | Sarkar et al. |
| 2014/0032768 A1 | 1/2014 | Ding et al. |
| 2014/0082165 A1 | 3/2014 | Marr et al. |
| 2014/0107851 A1 | 4/2014 | Yoon et al. |

FOREIGN PATENT DOCUMENTS

| | | |
|---|---|---|
| WO | WO-2012034273 | 3/2012 |
| WO | WO-2014025585 | 2/2014 |

\* cited by examiner

TASK ALLOCATION IN A COMPUTING ENVIRONMENT

CLAIM OF PRIORITY

This application claims the benefit of priority of Indian Patent Application No. 2281/MUM/2014, filed on Jul. 11, 2014, the benefit of priority of which is claimed hereby, and which is incorporated by reference herein in its entirety.

TECHNICAL FIELD

The present subject matter relates, in general, to task allocation and, particularly but not exclusively, to task allocation in a computing environment.

BACKGROUND

Computing environments typically comprise a plurality of servers interconnected with each other. Such computing environments render support to large scale applications and facilitate high speed computation of such applications. In such computing environments, tasks or applications to be executed are allocated to the computing devices based on predetermined parameters. For example, the tasks may be allocated to the computing devices based on their corresponding processing power.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
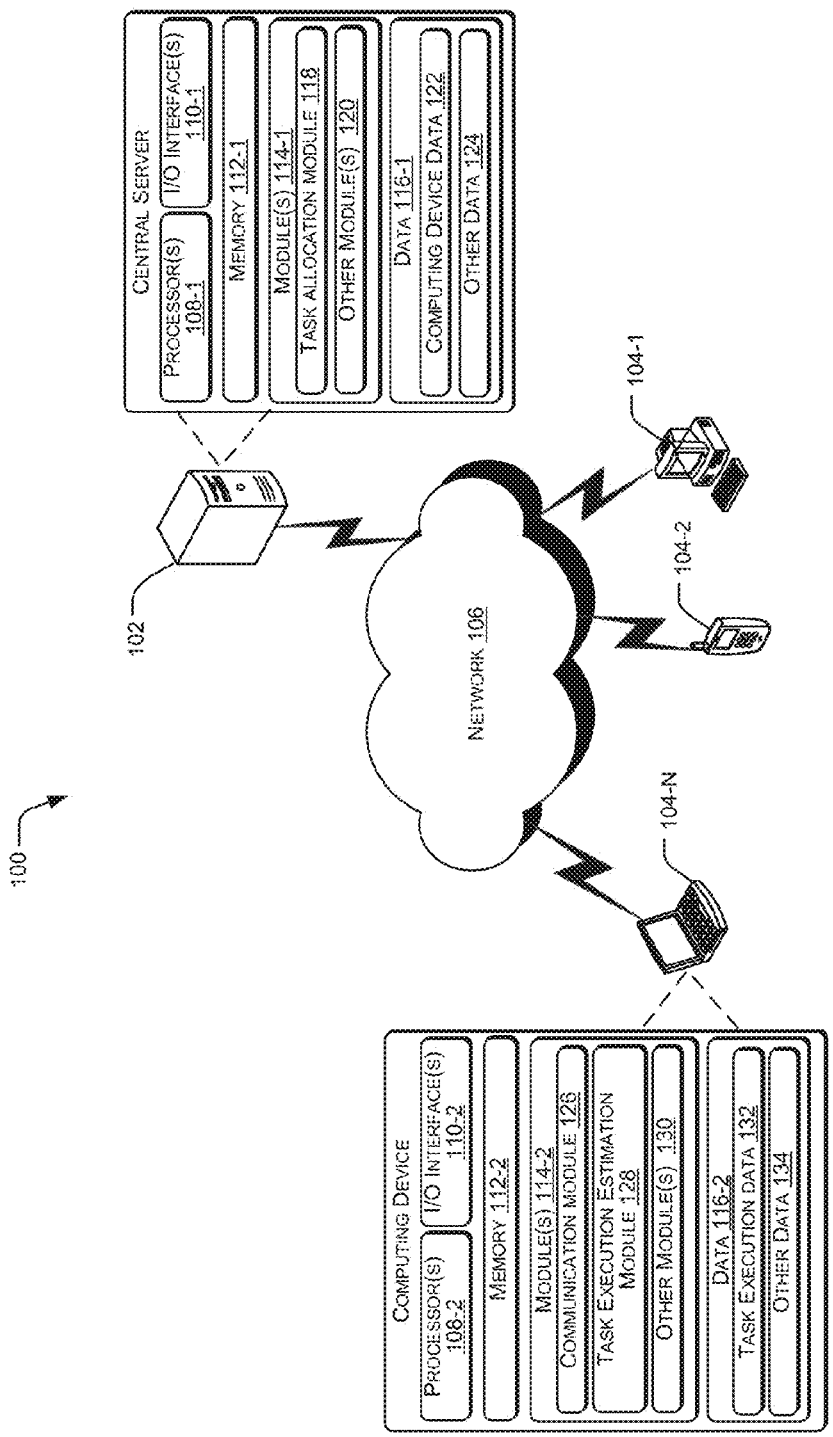
FIG. 1 illustrates a network environment implementing a task allocation system for task allocation in a computing environment, in accordance with an implementation of the present subject matter.

The present subject matter relates to task allocation in a computing environment. The computing environment may be understood as an architecture comprising a plurality of computing devices, such as servers interconnected with each other. Examples of the computing environment may include, but are not limited to, a personal computing environment, a distributed computing environment, a grid computing environment, a utility computing environment, and a cloud computing environment.

Computing environments are typically deployed for processing large scale applications, for example, data mining applications involving computationally intensive computations. In computing environments, computations pertaining to such applications are typically performed by dividing the application into smaller tasks. The tasks are subsequently distributed for execution amongst the computing devices present in the computing environment. Typically, each task has an associated deadline, i.e., a time period by which the task is to be completely executed. Thus, while allocating the tasks in the computing environment, the corresponding deadlines are taken into account in order to ensure that the tasks are completed within their stipulated time.

In a known approach for allocating tasks in a computing environment, a worst-case execution time (WCET) for executing a given task is computed for each of the computing devices. The worst-case execution time may be understood as the maximum time taken by a computing device for completely executing a task by utilizing its processing resources to their full capacities. Thereafter, the task may be allocated to a computing device based on the WCET corresponding to the computing device. However, in a case where the computing device is already performing other tasks, also referred to as active tasks, or is being used by a user for other applications, the processing resources to their fullest capacity may not be available for executing the task. As a result, the computing device may take more time to completely execute the application. Thus, subsequent actions based on the output of the complete execution of the task may be affected. Further, as the computing device has to simultaneously process the task in addition to the other tasks or applications, the computational time associated with the active tasks or applications may increase. As a result, the user utilizing the processing resources of the computing device may experience a degraded level of performance.

According to an embodiment of the present subject matter, systems and methods for task allocation in a computing environment are described. In accordance with the present subject matter, an estimated task execution time, i.e., time taken for completely executing a given task, is computed based on a WCET and a state transition model corresponding to a computing device. In an embodiment, the state transition model may indicate available processing resources of the computing device. The available processing resources, as used herein, indicate processing resources of the computing device which are not being utilized for any other processing by the computing device. Examples of the processing resources may include, but are not limited to, central processing unit (CPU) cycles, random access memory (RAM), cache, and Input Output (IO) speed, of the computing device. Thus, computation of the estimate task execution time based on the available processing resources may increase the accuracy in estimating the time taken for executing the task.

In an implementation, the computing device may receive a task execution estimation request message from a central sever. The task execution estimation request message may include the WCET corresponding to the computing device. Thereafter, the estimate task execution time may be computed based on the WCET and the state transition model. In an example, the state transition model includes a plurality of states corresponding to the computing device. In said example, each of the states may be annotated with information corresponding to the processing attributes. Further, the information may include a hold time corresponding to the state. The hold time may be understood as an average time period for which the computing device remains in the state.

Subsequently, the estimate task execution time may be transmitted to the central server. As may be understood, the computing environment may include a plurality of computing devices. Thus, the central server may receive the estimate task execution time from each of the computing devices. The central server may then accept all the estimate task execution times which are less than the deadline of the task. Thereafter, the central server may compare the estimate task execution times for identifying a computing device having lowest estimated task execution time and the task may be allocated to the identified computing device.

Thus, as the time taken for executing the task is computed based on the available processing resources of the computing device, time taken for complete execution of the task may be determined with high accuracy. As a result, subsequent tasks dependent on the given task may be executed with more accuracy. Furthermore, as the task is executed by utilizing the available processing resources, the user experience may not be affected.

FIG. 1 illustrates a task allocation system 100 for allocating tasks in a computing environment. The task allocation system 100 includes a central server 102 and a plurality of computing devices 104-1, 104-2, . . . , and 104-N, hereinafter collectively referred to as the computing devices 104 and individually referred to as the computing device 104. The central server 102 and the computing device 104 may communicate with each other, through a network 106, according to an embodiment of the present subject matter.

In an implementation, the central server 102 may be implemented as one or more systems, such as a cloud server, a mainframe computer, a workstation, a multiprocessor system, a network computer, and a gateway server. In an example, the central server 102 may be provisioned to allocate tasks amongst the computing devices 104. Examples of the computing device 104 may include, but are not limited to, a mobile phone, a smart phone, a personal digital assistant (PDA), a tablet, a laptop, a workstation computer, a server, and a personal computer.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. Further, the network 106 may include network devices that may interact with the central server 102 and the computing devices 104 through communication links.

In one implementation, the central server 102 and the computing device 104 include processors 108-1 and 108-2, respectively. The processors 108-1 and 108-2, hereinafter collectively referred to as the processor 108, may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Also, the central server 102 and the computing device 104 include I/O interface(s) 110-1 and 110-2, respectively. The I/O interfaces 110-1 and 110-2, collectively referred to as I/O interfaces 110 may include a variety of software and hardware interfaces that allow the central server 102 and the computing device 104 to interact with the network 106, or with each other. Further, the I/O interfaces 110 may enable the central server 102 and the computing device 104 to communicate with other communication and computing devices, such as web servers and external repositories. The central server 102 and the computing device 104 may further include memory 112-1 and 112-2, respectively, collectively referred to as memory 112. The memory 112-1 and 112-2 may be coupled to the processor 108-1 and the processor 108-2, respectively. The memory 112 may include any computer-readable medium known in the art including, for example, volatile memory (e.g., RAM), and/or non-volatile memory (e.g., EPROM, flash memory, etc.).

The central server 102 and the computing device 104 include modules 114-1, 114-2 and data 116-1, 116-2, respectively, collectively referred to as modules 114 and data 116, respectively. The modules 114 include routines, programs, objects, components, data structures, and the like, which perform particular tasks or implement particular abstract data types. The modules 114 further include modules that supplement applications on the central server 102 and the computing device 104, for example, modules of an operating system.

Further, the modules 114 can be implemented in hardware, instructions executed by a processing unit, or by a combination thereof. The processing unit can comprise a computer, a processor, such as the processor 108, a state machine, a logic array, or any other suitable devices capable of processing instructions. The processing unit can be a general-purpose processor which executes instructions to cause the general-purpose processor to perform the required tasks, or the processing unit can be dedicated to perform the required functions.

In another aspect of the present subject matter, the modules 114 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection. The data 116 serves, amongst other things, as a repository for storing data that may be fetched, processed, received, or generated by one or more of the modules 114.

In an implementation, the modules 114-1 of the central server 102 include a task allocation module 118 and other module(s) 120. In said implementation, the data 116-1 of the central server 102 includes computing device data 122 and other data 124. The other module(s) 120 may include programs or coded instructions that supplement applications and functions, for example, programs in the operating system of the central server 102. The other data 124 comprise data corresponding to one or more other module(s) 120.

Similarly, in an implementation, the modules 114-2 of the computing device 104 include a communication module 126, a task execution estimation module, and other module(s) 130. In said implementation, the data 116-2 of the computing device 104 includes task execution data 132 and other data 134. The other module(s) 130 may include programs or coded instructions that supplement applications and functions, for example, programs in the operating system of the computing device 104. The other data 134 comprise data corresponding to one or more other module(s) 130.

As mentioned previously, the central server 102 may be provisioned to allocate tasks amongst the computing devices 104. In an implementation, for allocating a task to a computing device, such as the computing device 104-1, from amongst the computing devices 104, the task allocation module 118 may compute a worst-case execution time (WCET) for each of the computing devices 104. The WCET may be understood as time taken by a computing device for completely executing the task when all the processing resources, for example, random access memory (RAM), central processing unit (CPU) cycles, and cache, of the computing device are fully available for executing the task. In an example, the task allocation module 118 may compute the WCET for each of the computing devices 104 based on corresponding computing device information. The computing device information may be understood as information pertaining to architecture or processing capabilities of the computing device and may include, but are not limited to, processor and RAM of the computing device. Upon computing the WCET, the task allocation module 118 may then transmit the corresponding WCETs to the computing devices 104. For instance, the task allocation module 118 may transmit a task execution estimation request message comprising the WCET to each of the computing devices 104.

In an implementation, the communication module 126 may receive the task execution estimation request message from the task allocation module 118. Based on the WCET, the task execution estimation module 128 may compute an estimate task execution time for executing the task. The estimate task execution time, as used herein, may be understood as time taken by the computing device for executing the task using the available processing resources. For instance, for a CPU which is seventy percent loaded with other tasks, only thirty percent of the CPU would be available for executing the task. Thus, the task execution estimation module 128, in such a case, may only take into consideration thirty percent CPU power for computing the estimate task execution time.

In an implementation, the task execution estimation module 128 may compute the estimate task execution time based on the WCET and a state transition model corresponding to the computing device 104. In an example, the state transition model comprises a plurality of states of the computing device 104. In said example, each state is annotated with processing information corresponding to one or more processing resources of the computing device 104, when the computing device 104 is in that state. Examples of the processing resources may include, but are not limited to, RAM, CPU cycles, and cache. The processing information may indicate a percentage of availability of the processing resource. For instance, processing information annotated with a state S1 of the computing device 104 may correspond to available CPU cycles of the computing device 104. Further, each of the states may be annotated with a hold time which indicates an average time period for which the computing device 104 remains in that state. For developing the state transition model, in an example, usage of the processing resources of the computing device 104 may be logged in the form of a time series in a processing log. Thereafter, the state transition model may be developed based on the processing log using known clustering algorithms. In another example, the state transition model may be developed based on the processing log using known machine learning techniques. The state transition model may further include a transition probability corresponding to each interlinked states of the state transition model. In an example, the transition probabilities may be computed from the processing log based on a usage pattern of the computing device 104.

In an implementation, for computing the estimate task execution time, the task execution estimation module 128 may identify a current state of the computing device 104. The current state may be understood as the state in which the computing device 104 receives the task execution estimation request message. Upon identifying the current state, the task execution estimation module 128 may ascertain one or more paths arising out of the current state based on the state transition model. Each path from among the paths may comprise one or more states of the computing device 104. Thereafter, the task execution estimation module 128 may compute a path task execution time and a path traverse value for each of the paths.

The path task execution time may be understood as time taken by the computing device 104 for executing the task on the path. In an example, the path task execution time may be based on the processing information and the hold time corresponding to the states present in the path. In said example, the task execution estimation module 128 may compute a task completion time for each of the states, starting with the current state, in the path. The task completion time may be understood as percentage of the WCET completed in the state. Upon computing the task completion time, the task execution estimation module 128 may then compare the task completion time for the current state with the WCET. In a case where the task execution estimation module 128 ascertains the task completion time to be less than the WCET, the task execution estimation module 128 may further compute another task completion time corresponding to the state subsequent to the current state. Thereafter, the task execution estimation module 128 may sum up the task completion time for both the states and may then compare the sum with the WCET. In a case where the sum is less than the WCET, the task execution estimation module 128 may then reiterate the updation of the sum by computing and adding the task completion time for the next state and may subsequently compare the updated sum with the WCET. Thus, as may be understood, the task execution estimation module 128 may repeat the process of updation and comparison till the sum is equal to or greater than the WCET. In the reiteration process, for a state in which the updated sum becomes equal to or exceeds the WCET, hereinafter also referred as the last state, the task execution estimation module 128 may sum up the hold time corresponding to each state, starting from the current state, till the last state to obtain the path task execution time for the path. Further, in said implementation, the task execution estimation module 128 may compute the path traverse value corresponding to the path. The path traverse value may be understood as a value obtained by multiplying the transition probabilities of all the states starting from the current state to the last state.

Upon computing the path task execution time and the path traverse value for the paths, the task execution estimation module 128 may compare the path traverse values for determining a path having a highest path traverse value. The path task execution time corresponding to the path may then be selected as the estimate task execution time. The task execution estimation module 128 may then store the estimate task execution value in the task execution data. Subsequently, the communication module 126 may transmit the estimate task execution time to the central server 102.

In an example, the task allocation module 118 may receive the estimated task execution times from each of the computing devices 104. Thereafter, the task allocation module 118 ascertains a lowest estimated task execution time from amongst the task execution times. Subsequently, the task allocation module 118 may compare the lowest estimate task execution time with a target task execution time corresponding to the task. The target task execution time may be understood as a time within which the task is to be completed. In a case where the lowest estimate task execution time is less than the target task execution time, the task allocation module 118 may allocate the task to the corresponding computing device 104.

Figure 2:
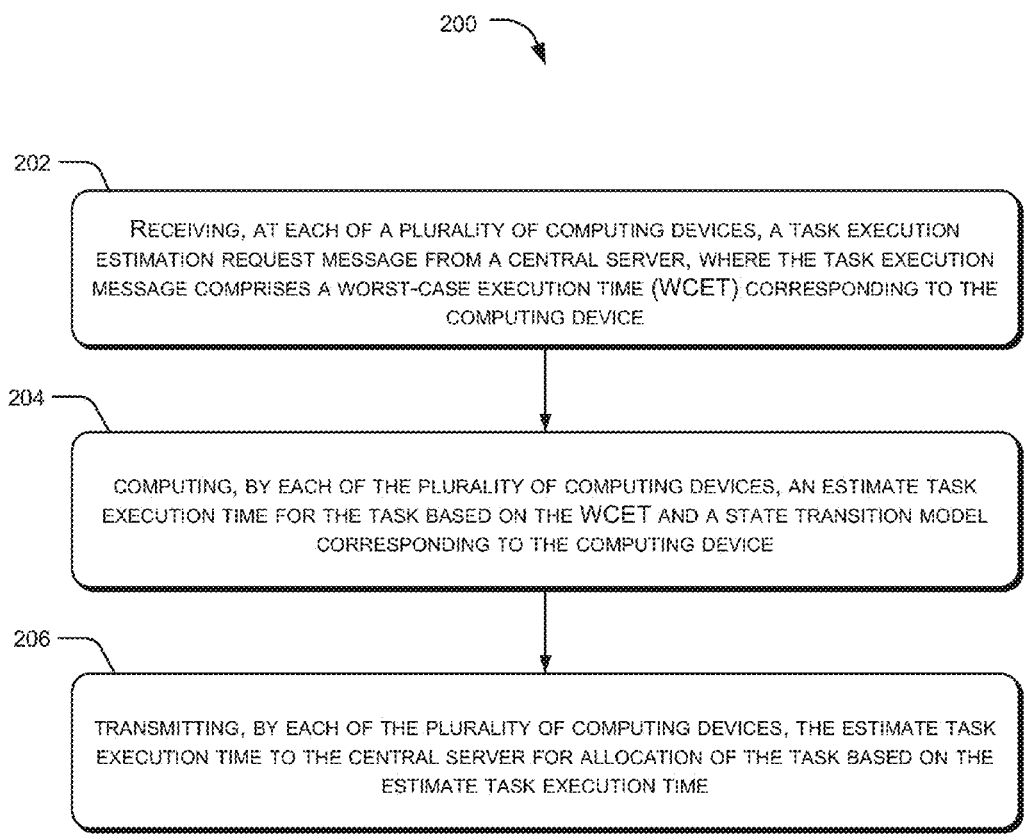
FIG. 2 illustrates a method for task allocation in a computing environment, in accordance with an implementation of the present subject matter.

FIG. 2 illustrates a method 200 for allocating a task in a computing environment, according to an embodiment of the present subject matter. The method 200 may be implemented in a variety of computing systems in several different ways. For example, the method 200, described herein, may be implemented using the central server 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the application server 102, the description may be extended to other systems as well.

With reference to the description of FIG. 2, for the sake of brevity, the details of the components of the central server 102 are not discussed here. Such details can be understood as provided in the description provided with reference to FIG. 1.

Referring to the FIG. 2, at block 202, at each of a plurality of computing devices, a task execution estimation request message is received from a central server, where the task execution estimation request message comprises a worst-case execution time (WCET) corresponding to the computing device. The WCET may be understood as time taken by the computing device for executing the application when all the processing resources, for example, CPU cycles, RAM, and cache, are fully available. In an implementation, the WCET may be computed based on computing device information corresponding to the computing device. The computing device information may be understood as information pertaining to processing capabilities of the computing device and may include, but are not limited to, processor and RAM of the computing device.

At block 204, by each of the computing devices, an estimate task execution time for the task is computed based on the WCET and a state transition model corresponding to the computing device. The estimate task execution time may be understood as time taken by the computing device for executing the task using available processing resources. In an example, the estimate task execution time may be computed based on the state transition model. The state transition model may indicate the available processing resources of the computing device. In an example, the state transition model may comprise a plurality of state, such that each state may indicate the available processing resources of the computing device, when the computing device is in that state. In said example, each state may be annotated with processing information corresponding to one or more processing resources. For example, a state S1 may be annotated with processing information corresponding to free CPU cycles and free cache of the computing device. Further, the state may also be annotated with a corresponding hold time. The hold time may be understood as a time period for which the computing device remains in that state in average. In an implementation, for computing the estimate task execution time, a current state of the computing device may be identified. Thereafter, one or more paths from the current state may be ascertained. Once the paths from the current state are ascertained, for each path, a path task execution time and a path traverse value may be computed. Thereafter, a path having the highest path traverse value may be determined. The path task execution time corresponding to the path having the highest path traverse value may then be ascertained to be the estimate task execution time.

At block 206, the estimate task execution time is transmitted to the central sever by each of the computing devices for allocation of the task based on the estimate task execution time. Upon receiving the estimate task execution time from the computing devices, a computing device having lowest estimate task execution time may be identified. Thereafter, the lowest estimate task execution time may be compared with a target task execution time. In a case where the lowest estimate task execution time is less than the target task execution time, the task may be allocated to the corresponding computing device.

Although implementations for methods and systems for task allocation in a computing environment are described, it is to be understood that the present subject matter is not necessarily limited to the specific features or methods described. Rather, the specific features and methods are disclosed as implementations for task allocation in a computing environment.

We claim:

1. A method for allocating a task in a computing environment, the method comprising:

receiving, at each of a plurality of computing devices, a task execution estimation request message from a central server, wherein the task execution estimation request message comprises a worst-case execution time (WCET) corresponding to the computing device;

computing, by each of the plurality of computing devices, an estimate task execution time for the task based on the WCET and a state transition model corresponding to the computing device, wherein the state transition model indicates available processing resources corresponding to the computing device, wherein the computing comprises:

identifying a current state of the computing device, wherein the current state is a state in which the task execution estimation request message is received;

ascertaining one or more paths from the current state based on the state transition model, wherein the state transition model comprises a plurality of states of the computing device, and wherein each path from the one or more paths comprises one or more states from amongst the plurality of states of the computing device;

computing, for each path from the one or more paths, a path task execution time and a path traverse value, wherein the path task execution time indicates a time period taken by the computing device for executing the task on the path, and wherein the path task execution time is based on processing information annotated with each of the one or more states corresponding to the path, and wherein the processing information corresponds to the available processing resources of the computing device in the state, and wherein the path traverse value indicates a probability of the computing device to traverse the path;

determining a path, from amongst the one or more paths, having a highest path traverse value;

selecting the path task execution time corresponding to the path as the estimate task execution time;

transmitting, by each of the plurality of computing devices, the estimate task execution time to the central server;

allocating the task to a computing device from amongst the plurality of computing devices based on the estimate task execution time corresponding to the computing devices; and executing the task on the computing device from amongst the plurality of computing devices.

2. The method as claimed in claim 1, wherein the processing information corresponds to at least one of a percentage of free computational cycles of a processor of the computing device and a hold time associated with each of the plurality of states, wherein the hold time indicates a time period for which the computing device is in the state.

3. A task allocation system for allocating tasks to a plurality of computing devices comprising:
   a central server comprising:
      a processor; and
      a task allocation module coupled to the processor to:
         compute a worst-case execution time (WCET) for executing a task for each of a plurality of computing devices based on computing device information corresponding to each of the plurality of computing devices;
         transmit a task execution estimation request message to each of the plurality of computing devices, wherein the task execution estimation request message comprises a corresponding WCET;
         receive an estimate task execution time from each of the plurality of computing devices; and
         allocate the task to a computing device from among the plurality of computing devices based on the corresponding estimate task execution time of the computing device;
   each of the computing devices comprising:
      a second processor to:
         execute the task on the computing device upon the allocation of the task from the central server based on the estimate task execution time;
      a task execution estimation module coupled to the second processor to:
         compute an estimate task execution time for a task based on a worst-case execution time (WCET) and a state transition model corresponding to the computing device, wherein the state transition model indicates available processing resources corresponding to the computing device, wherein the task execution estimation module is further configured to,
         identify a current state of the computing device in which the task execution estimation request message is received;
         ascertain one or more paths from the current state based on the state transition model, wherein the state transition model comprises a plurality of states of the computing device, and wherein each path from the one or more paths comprises one or more states from amongst the plurality of states of the computing device;
         compute, for each path from the one or more paths, a path task execution time and a path traverse value, wherein the path task execution time indicates a time period taken by the computing device for executing the task on the path, and wherein the path task execution time is based on processing information annotated with each of the one or more states, and wherein the processing information corresponds to the available processing resources of the computing device in the state, and wherein the path traverse value indicates a probability of the computing device to traverse the path;
         determine a path, from amongst the one or more paths, having a highest path traverse value; and
         select the path task execution time corresponding to the task as the estimate task execution time;
      a communication module coupled to the second processor to:
         transmit the estimate task execution time to a central server.

4. The task allocation system as claimed in claim 3, wherein the task allocation module further is to retrieve the computing device information corresponding to each of the plurality of computing devices from a database.

5. The task allocation system as claimed in claim 3, wherein the task allocation module further is to,
   select one or more computing devices from amongst the plurality of computing devices, wherein each of the computing device from amongst the one or more computing devices has an estimate task execution less than a target task execution time corresponding to the task; and
   ascertain a computing device from amongst the one or more computing devices, wherein the computing device has a lowest estimate task execution time for executing the task.

6. A non-transitory computer-readable medium having embodied thereon a computer program for executing a method for the method comprising:
   receiving, at each of a plurality of computing devices, a task execution estimation request message from a central server, the task execution estimation request message comprising a worst-case execution time (WCET) corresponding to the computing device;
   computing, by each of the plurality of computing devices, an estimate task execution time for the task based on the WCET and a state transition model corresponding to the computing device, wherein the state transition model indicates available processing resources corresponding to the computing device, wherein the computing comprises:
   identifying a current state of the computing device, wherein the current state is a state in which the task execution estimation request message is received;
   ascertaining one or more paths from the current state based on the state transition model, wherein the state transition model comprises a plurality of states of the computing device, and wherein each path from the one or more paths comprises one or more states from amongst the plurality of states of the computing device;

computing, for each path from the one or more paths, a path task execution time and a path traverse value, wherein the path task execution time indicates a time period taken by the computing device for executing the task on the path, and wherein the path task execution time is based on processing information annotated with each of the one or more states corresponding to the path, and wherein the processing information corresponds to the available processing resources of the computing device in the state, and wherein the path traverse value indicates a probability of the computing device to traverse the path;

determining a path, from amongst the one or more paths, having a highest path traverse value;

selecting the path task execution time corresponding to the path as the estimate task execution time;

transmitting, by each of the plurality of computing devices, the estimate task execution time to the central server;

allocating the task to a computing device from amongst the plurality of computing devices based on the estimate task execution time corresponding to the computing device; and executing by the processor, the task on the computing device from amongst the plurality of computing devices.

\* \* \* \* \*